United States Patent [19]

Omokawa et al.

[11] Patent Number: 5,769,976
[45] Date of Patent: Jun. 23, 1998

[54] PNEUMATIC TIRE AND METHOD OF MAKING THE SAME

[75] Inventors: Toshihiko Omokawa, Fukushima-ken; Shigeki Yoshioka, Shirakawa, both of Japan

[73] Assignee: Sumitomo Rubber Industries, Ltd., Hyogo-ken, Japan

[21] Appl. No.: 599,161

[22] Filed: Feb. 9, 1996

[51] Int. Cl.$^6$ .................................................. B60C 11/01
[52] U.S. Cl. .................................. 152/209 R; 156/110.1; 156/130.7; 264/326; 425/47
[58] Field of Search ........................ 152/209 R, 209 D, 152/523; 156/128.1, 130.7, 110.1; 425/28.1, 35, 46, 47; 264/326, 328.3

[56] References Cited

U.S. PATENT DOCUMENTS

| | | | |
|---|---|---|---|
| 1,542,797 | 6/1925 | Midgley | 425/47 |
| 2,874,745 | 2/1959 | Wann | 152/523 |
| 2,972,368 | 2/1961 | Williams | 152/523 |
| 3,854,853 | 12/1974 | Mirtain | 425/46 |
| 3,989,791 | 11/1976 | Tippin | 425/47 |
| 4,152,186 | 5/1979 | Shibata | 152/209 R |
| 4,214,618 | 7/1980 | Takigawa et al. | 152/209 D |
| 4,655,699 | 4/1987 | Collier | 425/46 |
| 5,571,351 | 11/1996 | Hatakenaka et al. | 152/209 R |

FOREIGN PATENT DOCUMENTS

| | | | |
|---|---|---|---|
| 114594 | 4/1989 | Germany | 152/209 R |
| 59-89205 | 5/1984 | Japan | 152/209 R |
| 23911 | 1/1991 | Japan | 425/47 |
| 110209 | 4/1992 | Japan | 152/209 R |
| 92110 | 4/1994 | Japan | 152/209 R |

*Primary Examiner*—Steven D. Maki
*Attorney, Agent, or Firm*—Birch, Stewart, Kolasch & Birch, LLP

[57] ABSTRACT

A pneumatic tire and a method of making the same are disclosed, wherein the tire is made by vulcanizing a green tire in a split mold. The mold has circumferentially extending split lines at a position corresponding to the tire buttress region. The inner surface of the mold is provided with protrusions immediately radially outside the split lines and ribs immediately radially inside the split lines, so that the vulcanized tire is provided with depressions and grooves corresponding to the protrusions and ribs, respectively. Therefore, the raw tire rubber does not get between the split faces of the mold, and the occurrence of burrs along the mold-split lines can be completely prevented.

3 Claims, 4 Drawing Sheets

Fig. 5 CONVENTIONAL
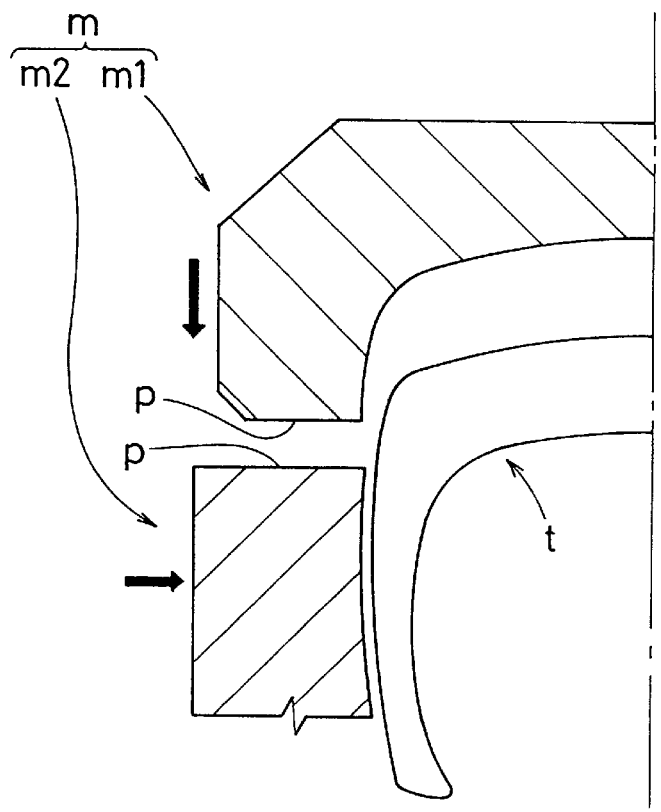
Fig. 6 CONVENTIONAL
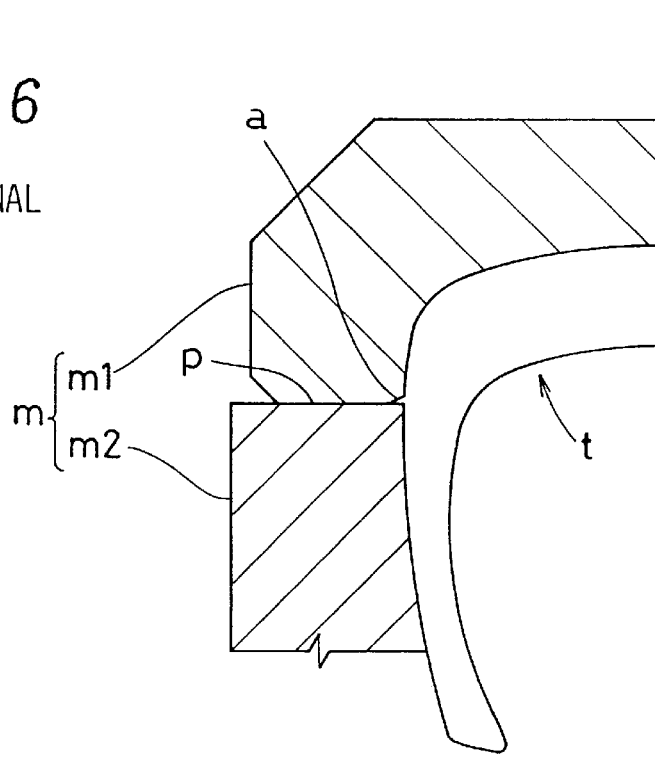

PNEUMATIC TIRE AND METHOD OF MAKING THE SAME

The present invention relates to a pneumatic tire and a method of making the same, in which the occurrence of burrs of rubber caused in the buttress portion of the tire along split lines of the vulcanizing mold are prevented.

BACKGROUND OF THE INVENTION

Generally, pneumatic tires, for example, snow tires having a block type tread pattern and the like, are manufactured by vulcanizing a green tire (raw tire) in a split mold.

As shown in FIGS. 5 and 6, such a mold (m) usually comprises sidewall dies (m2) (hereinafter side-plate) disposed on both sides of a green tire (t) and tread dies (m1) (hereinafter sector plate) disposed around the tire.

When vulcanizing a green tire (t), each side-plate (m2) is moved axially inwardly towards one of the tire sidewalls and the sector plates (m1) are moved radially inwardly towards the tire tread as shown in FIG. 5 by arrows, and the split faces (p) of the sector plates (m1) and the side-plates (m2) contact with each other to close the space therebetween as shown in FIG. 6. Thus, the dies (m1 and m2) collectively form a closed shell structure. Then, a bladder or tube disposed inside the tire in advance is inflated to a high pressure to thereby pressurize the inside of the tire to press the tire outer surface against the negative impression of the mold.

However, at the time of closing the space between the split faces (p) of the sector plates (m1) and side-plates (m2), the tire raw rubber is liable to get between the split faces (p). As a result, the so-called burrs (a) are formed on the outer surface of the vulcanized tire along the split lines of the mold.

Incidentally, lines corresponding to the split lines of a mold are more or less formed on the outer surface of a vulcanized tire. Thus, the split lines of the mold is recognizable from such lines on the tire outer surface (hereinafter mold-split lines).

SUMMARY OF THE INVENTION

It is therefore, an object of the present invention to provide a pneumatic tire and a method of making the same, in which the occurence of burrs due to the tire rubber being bitten between the split faces of the vulcanizing mold can be avoided.

According to one aspect of the present invention, a pneumatic tire comprises a tread portion and a pair of sidewall portions extending radially inwardly from tread edges, each sidewall portion having in a buttress region of the tire a circumferentially extending mold-split line impressed by a split line of a split mold, wherein each sidewall portion is provided with a plurality of depressions and a circumferential groove, the depressions are formed radially outside the impressed mold-split line and arranged in a row along and adjacent to the impressed mold-split line, each depression having a depth of 0.5 to 5.0 mm and a maximum circumferential length of 5.0 to 10.0 mm, and the circumferential groove is formed radially inside the impressed mold-split line and extending along and adjacent to the impressed mold-split line, the circumferential groove having a depth of 1.0 to 3.0 mm and a width of from 2 to 10 mm.

Preferably, the total of the maximum circumferential lengths of the depressions is not less than 50% of the circumferential length measured at the corresponding position.

According to another aspect of the present invention, a method of making the tire comprises steps of building a green tire, putting the green tire in the split mold, closing the split mold, and vulcanizing the green tire in the split mold, the split mold comprising side-plates for molding the axially outer surface of the tire sidewall portions and sector plates for molding the radially outer surface of the tire tread portion, the side-plates disposed oppositely each other in the axial direction of the tire and being movable in the axial direction, the sector plates disposed radially outside the sidewall plates and being movable in the radial direction of the tire, in the closed state of the mold, the sector plates extending between radially outer edges of the side-plates to define the split lines between the radially outer edges of the side-plates and radially inner edges of the sector plates, the inner surfaces of the sector plates provided adjacent to the split lines with protrusions, the protrusions arranged circumferentially at intervals, the height of the protrusions gradually increasing radially outwardly from the the split lines, and the maximum height thereof is in the range of from 0.5 to 5.0 mm, the inner surface of each side-plates provided adjacent to the split line with a circumferentially extending rib, the maximum height of the rib is in the range of from 1.0 to 3.0 mm.

Therefore, the protrusions of the sector plates for forming the depressions and the ribs of the side-plates for forming the groove push back the green tire from the split faces when closing the mold. Thus, the tire raw rubber is prevented from being bitten between the split faces of the mold, and the occurence of burrs can be effectively prevented.

BRIEF DESCRIPTION OF THE DRAWINGS

Embodiments of the present invention will now be explained according to drawings.

FIGS. 5 and 6 are cross sectional views for explaining the conventional art.

DETAILED DESCRIPTION OF THE INVENTION

Figure 1:
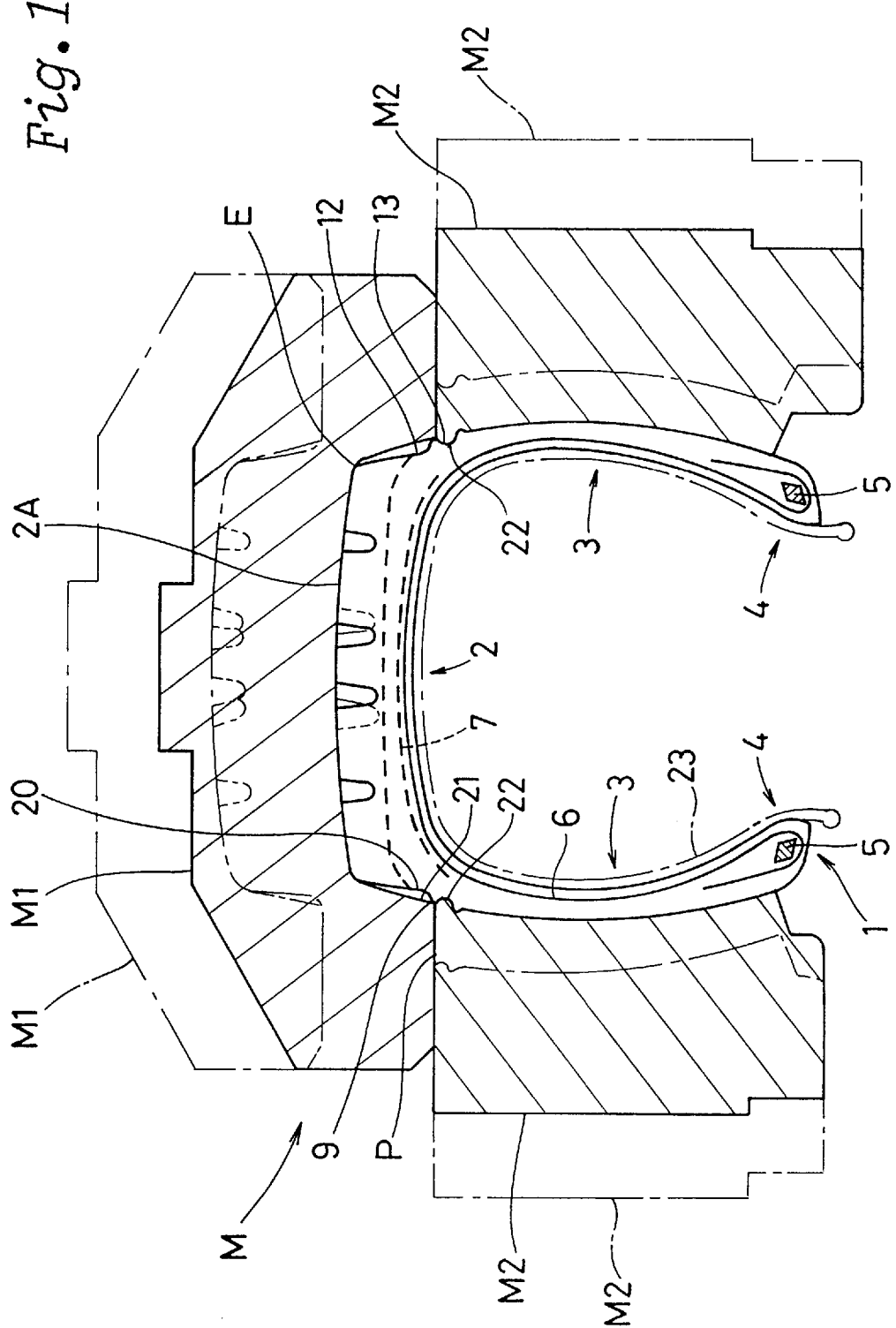
FIG. 1 is a cross sectional view showing a tire and a split mold.

In FIG. 1, the pneumatic tire 1 according to the present invention is a block pattern tire. The tire comprises a tread portion 2 with a tread face 2A, a pair of axially spaced bead portions 4, a pair of sidewall portions 3 extending between the tread edges and the bead portions, a carcass 6 extending between the bead portions 4 through the tread portion 2 and sidewall portions 3 and turned up around bead cores 5, and a belt 7 disposed radially outside the carcass 6 and inside the tread portion 2.

The carcass 6 comprises at least one ply, in this embodiment only one ply of cords arranged radially at an angle of from 90 to 75 degrees with respect to the tire equator. For the carcass cords, organic fiber cords, e.g. polyester, aromatic polyamide, nylon, rayon and the like are used.

The belt 7 comprises two cross plies, each made of parallel cords laid at a small angle of not more than 5 degrees with respect to the tire equator. For the belt cords, steel cords or organic fiber cords, e.g. aromatic polyamide, nylon, polyester, rayon and the like are used.

The pneumatic tire 1 is made by vulcanizing and molding a green tire 1A in a split mold M.

The split mold M comprises side-plates M2 and sector plates M1. When viewed from the axially outside, each sidewall plate M2 has an annular shape and each sector plate M1 has a fan shape. The side-plates M2 are disposed oppositely each other so as to face the axially outer surface of the tire sidewall portions 3. The sector plates M1 are disposed around the radially outside of the sidewall plates M2 so as to face the radially outer surface of the tire tread portion 2.

The radially inner surface of the sector plates M1 is provided with the negative impression of the block pattern. The split line between each of the side-plates and sector plates make a circle, and its corresponds position on the tire is in the buttress region. The buttress region is a radially outer region of the sidewall portion which is immediately radially inside the tread edge and buttresses 11 are provided.

The sector plates M1 are supported movably in the radial direction and the side-plates M2 are supported movably in the axial direction. To close the mold M, the sector plates M1 are moved radially inwardly and the side-plates M2 are moved axially inwardly.

In order to form the buttress region, the inner surface of the sector plate M1 is provided radially adjacent to the split face P with protrusions 20. The protrusions 20 are arranged circumferentially at a regular pitch, forming a space 21 therebetween. Each of the protrusions 20 extends radially outwardly from the edge of the split face P.

Figure 4:
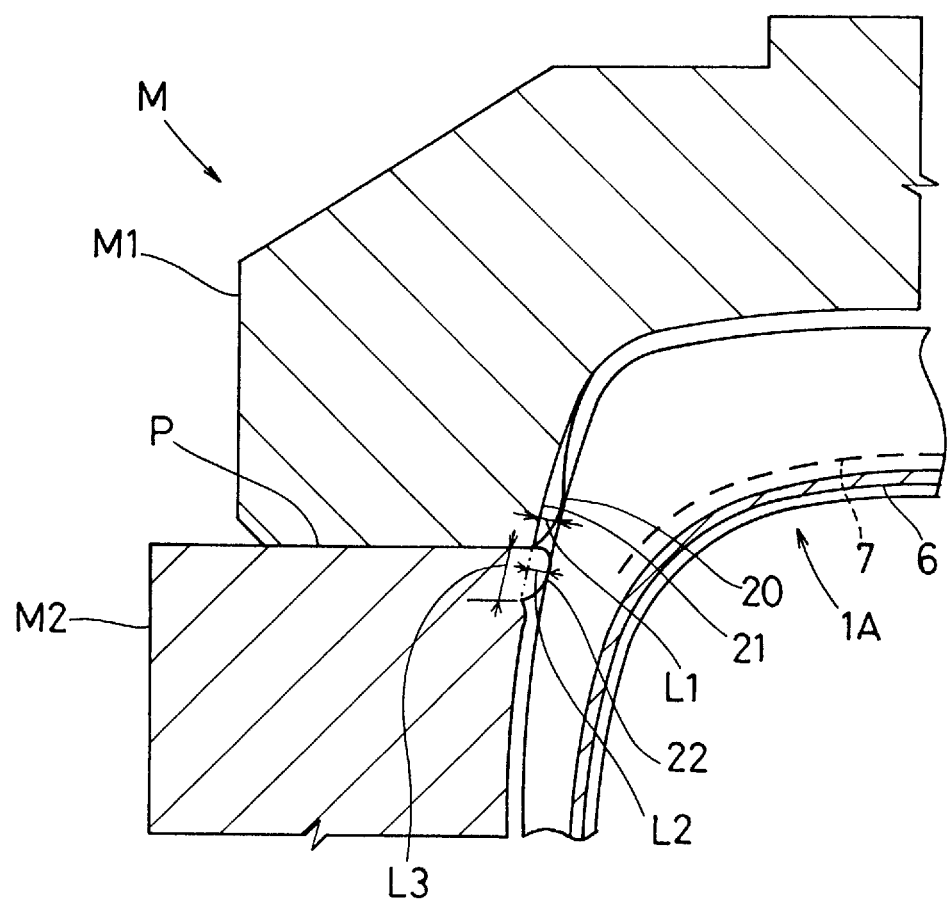
FIG. 4 is a cross sectional view showing that the split mold is closed but the tire raw rubber does not get between the split faces of the mold.

As shown in FIG. 4, the height of the protrusions 20 increase gradually from the edge of the split face P towards the radially outside thereof and also increases gradually from the position corresponding to the tread edge E towards the radially inside thereof. The maximum height L1 thereof is limited in the range of from 0.5 to 5.0 mm.

The maximum circumferential length of the protrusions 20 is in the range of 5.0 to 10.0 mm, which occurs at the radially inner end thereof in this embodiment. The maximum circumferential lengths of the protrusions 20 amount to 50 to 90% of the overall circumferential length measured at the corresponding position, that is, the radially inner end of the protrusions in this embodiment.

In a cross section including the tire axis, the profile of the protrusions 20 is smoothly curved by an arc.

On the other hand, the axially inner surface of the side-plate M2 is provided radially adjacent to the split face P with a rib 22. The rib 22 extends continuously in the circumferential direction.

The maximum height L2 of the rib 22 is in the range of from 1.0 to 3.0 mm, and the width L3 is in the range of from 2 to 10 mm.

When the sector plates M1 are moved radially inwardly and the side-plates M2 are moved axially inwardly to close the mold M, the protrusions 20 and rib 22 push back the sidewall rubber of the tire disposed therein far from the split faces P as shown in FIG. 4. Thus, the rubber is prevented from being pinched between the split faces P.

Then, heating the green tire 1A, the inside of the tire is pressurized at a high pressure by means of inflation of a bladder 23 disposed therein, whereby the outer surface of the tire is pressed onto the inner surface of the mold M.

Figure 2:
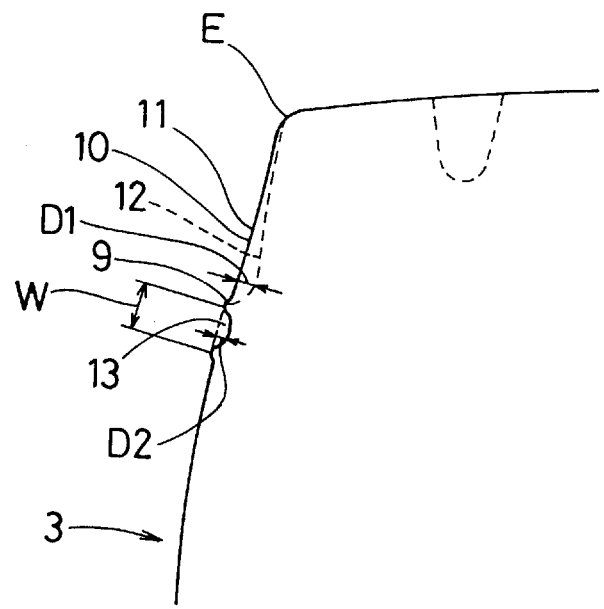
FIG. 2 is a schematic cross sectional view of the tire showing the buttress region of the sidewall portion of the tire.
Figure 3:
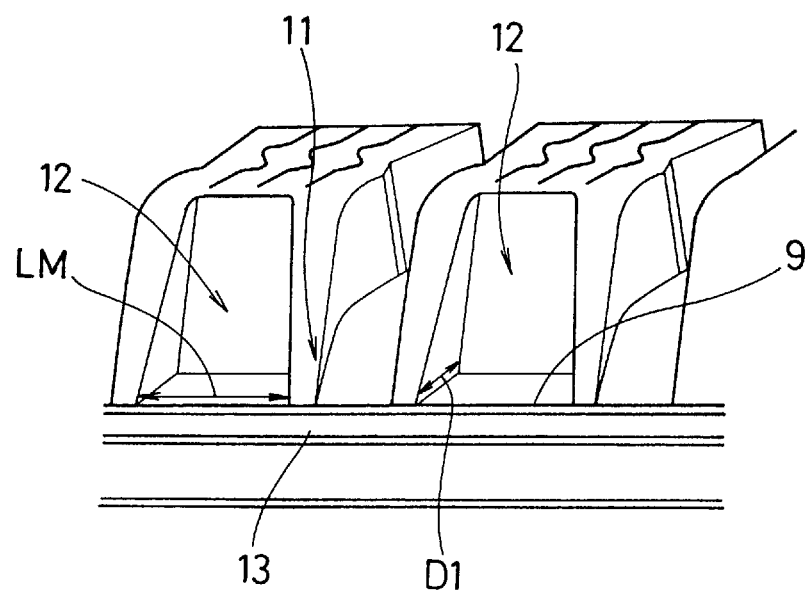
FIG. 3 is a perspective view of the buttress region.

As a result, the block pattern is impressed in the tread portion, and depressions 12 being negative of the protrusions 20 and a circumferential groove 13 being negative of the rib 22 are impressed in the buttress region of the vulcanized tire as shown in FIGS. 2 and 3.

Accordingly, the depressions 12 have a maximum depth D1 of 0.5 to 5.0 mm, and a maximum circumferential length LM of 5.0 to 10.0 mm. The maximum circumferential lengths LM of the depressions 12 amount to 50 to 90% of the total length measured along the circumference passing at the maximum length position. The circumferential groove 13 has a depth D2 of from 1.0 to 3.0 mm and a width W of from 2 to 10 mm.

Further, the buttress 11 are formed between the depressions 12 at a regular interval.

Furthermore, a mold-split line 9 corresponding to the split line or border line between the split faces P is impressed between the depressions 12 and the circumferential groove 13. But, no burr is formed.

Preferably, the mold-split line 9 is positioned radially outside the axial end of the belt 7 because deformation of the green tire 1A during closing the mold is small in this region which is thus desirable for preventing the rubber from being bitten between the split faces.

If the depth of the depressions 12 of the tire or the height of the protrusions 20 of the sector plates is less than 0.5 mm, it is difficult to push back the green tire on the radially outside of the split line. Thus, burrs are liable to occur. If the depth or height is more than 5.0 mm, a stress concentration is liable to occur around the depressions. Thus, the durability of the tire decreases.

If the maximum length of the depressions 12 or protrusions 20 is less than 5.0 mm, it is difficult to push back the green tire on the radially outside of the split line. Thus, burrs are liable to occur. If the maximum length is more than 10.0 mm, the tire strength decreases in the buttress region.

If the depth of the circumferential grooves 13 of the tire or the height of the ribs 22 of the side-plates is less than 1.0 mm, as the amount of pushing-back is very small, burrs are liable to occur. If the depth or height is more than 3.0 mm, the profile of the tire excessively changes at the grooves 13 and a stress concentration is liable to occur.

If the width of the circumferential grooves 13 or the ribs 22 is less than 2 mm, it is difficult to push back the green tire by the side-plates, and burrs are liable to occur. If the width is more than 10 mm, the tire strength decreases in the buttress region.

If the total length of the depressions or protrusions is less than 50%, the sector plates can not push back the green tire the rubber on the radially outside of the split lines is bitten between the split faces and burrs occur. The total length is more preferably set in the range of not more than 90%, thereby effectively preventing the change in the tire profile line, the concentration of stress and the decrease in the tire strength. Incidentally, the above-mentioned height and depth are measured from the profile line of the tire and mold normally thereto. The width and length are measured along the profile line.

By gradually increasing the height of the depressions or the depth of the protrusions, the effect of the protrusions is further enhanced. Preferably, the maximum heights of the protrusions 20 and ribs 22, that is, the maximum depths of the depressions 12 and grooves 13 occur at a position within 10 mm from the split lines.

As described above, according to the present invention, the occurrence of rubber burrs along the mold-split lines can be completely prevented.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A pneumatic tire comprising a tread portion and a pair of sidewall portions extending radially inwardly from tread edges, each sidewall portion having in a buttress region of the tire a circumferentially continuously extending line impressed by a split line of a split mold, wherein each sidewall portion is provided with a plurality of depressions and a circumferential groove and with no burrs occurring along the impressed line, said plurality of depressions are formed radially outside the impressed line and arranged in spaced relationship in a circumferentially extending row along and adjacent to the impressed line, each of said depressions extending radially outwards starting from the impressed line and having a depth of 0.5 to 5.0 mm and a maximum circumferential length of 5.0 to 10.0 mm, said depth gradually increasing radially outwardly from the impressed line so that a maximum depth occurs at a position within 10 mm from the impressed line, and the circumferential groove is formed radially inside the impressed line and extending along and adjacent to the impressed line, the circumferential groove having a depth of 1.0 to 3.0 mm and a width of from 2 to 10 mm, the circumferential groove having a maximum depth at a position within 10.0 mm from the impressed line.

2. The pneumatic tire according to claim 1, wherein the total of the maximum circumferential lengths of said depressions is not less than 50% of the total length measured at the circumference passing at the maximum circumferential lengths.

3. A method of making a pneumatic tire, wherein the method comprises steps of building a green tire, inserting the green tire into a split mold, closing the split mold, and vulcanizing the green tire in the split mold, the mold comprising side-plates for molding the axially outer surface of tire sidewall portions and sector plates for molding the radially outer surface of a tire tread portion, the side-plates disposed oppositely each other in the axial direction of the tire and being movable in the axial direction, the sector plates disposed radially outside the sidewall plates and being movable in the radial direction of the tire, in the closed state of the mold, the sector plates extending between radially outer edges of the side-plates to define split lines between the radially outer edges of the side-plates and radially inner edges of the sector plates, wherein the inner surfaces of the sector plates are provided adjacent to the split lines with protrusions for forming depressions, the protrusions are arranged circumferentially at intervals, each of the protrusions extending radially outwards starting from one of the split lines, the height of the protrusions gradually increases radially outwardly from the split lines so that a maximum height occurs at a position within 10.0 mm from the split lines and the maximum height is in the range of from 0.5 to 5.0 mm, and inner surface of each of the side-plates is provided adjacent to the split line with a circumferentially extending rib for forming a circumferential groove, the maximum height of the rib being in the range of from 1.0 to 3.0 mm and occurring at a position within 10.0 mm from the split lines, and wherein the closing of the split mold includes axially moving the side-plates and radially moving the sector plates and wherein the vulcanized tire includes tire sidewall portions molded by said side-plates, a tire tread portion molded by said sector plates, each sidewall portion including a circumferentially continuously extending line impressed by a split line of the split mold with no burrs occurring alone the impressed line, a plurality of depressions formed by the protrusions and a circumferential groove formed by the rib.

\* \* \* \* \*

UNITED STATES PATENT AND TRADEMARK OFFICE
CERTIFICATE OF CORRECTION

PATENT NO.   : 5,769,976
DATED        : June 23, 1998
INVENTOR(S)  : Toshihiko OMOKAWA et al.

It is certified that error(s) appears in the above-identified patent and that said Letters Patent is hereby corrected as shown below:

Title page, item [30] Foreign Application Priority Data, should read --

Feb. 13, 1995 [JP] Japan ..................................................7-49207

Signed and Sealed this

Fifteenth Day of December, 1998

Attest:

BRUCE LEHMAN

*Attesting Officer*            *Commissioner of Patents and Trademarks*